April 6, 1926.                D. YBARRA                1,580,082
                          MOTOR FOR AIRCRAFTS
                          Filed Feb. 4, 1925        6 Sheets-Sheet 1
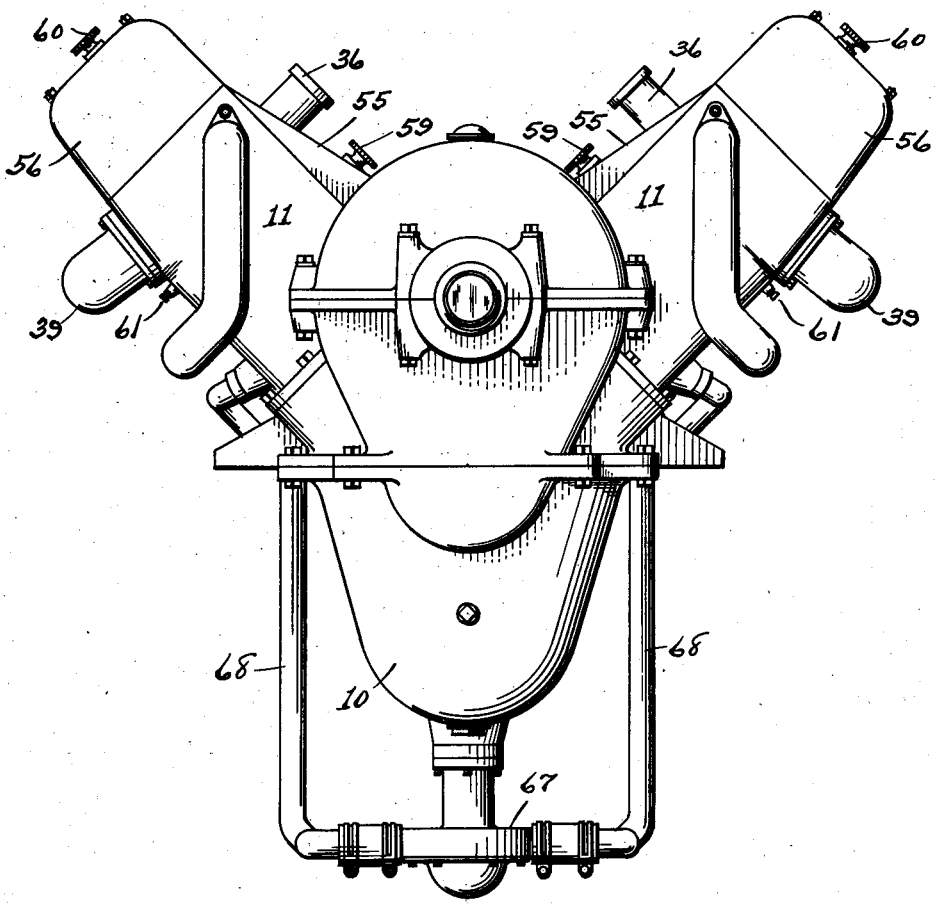

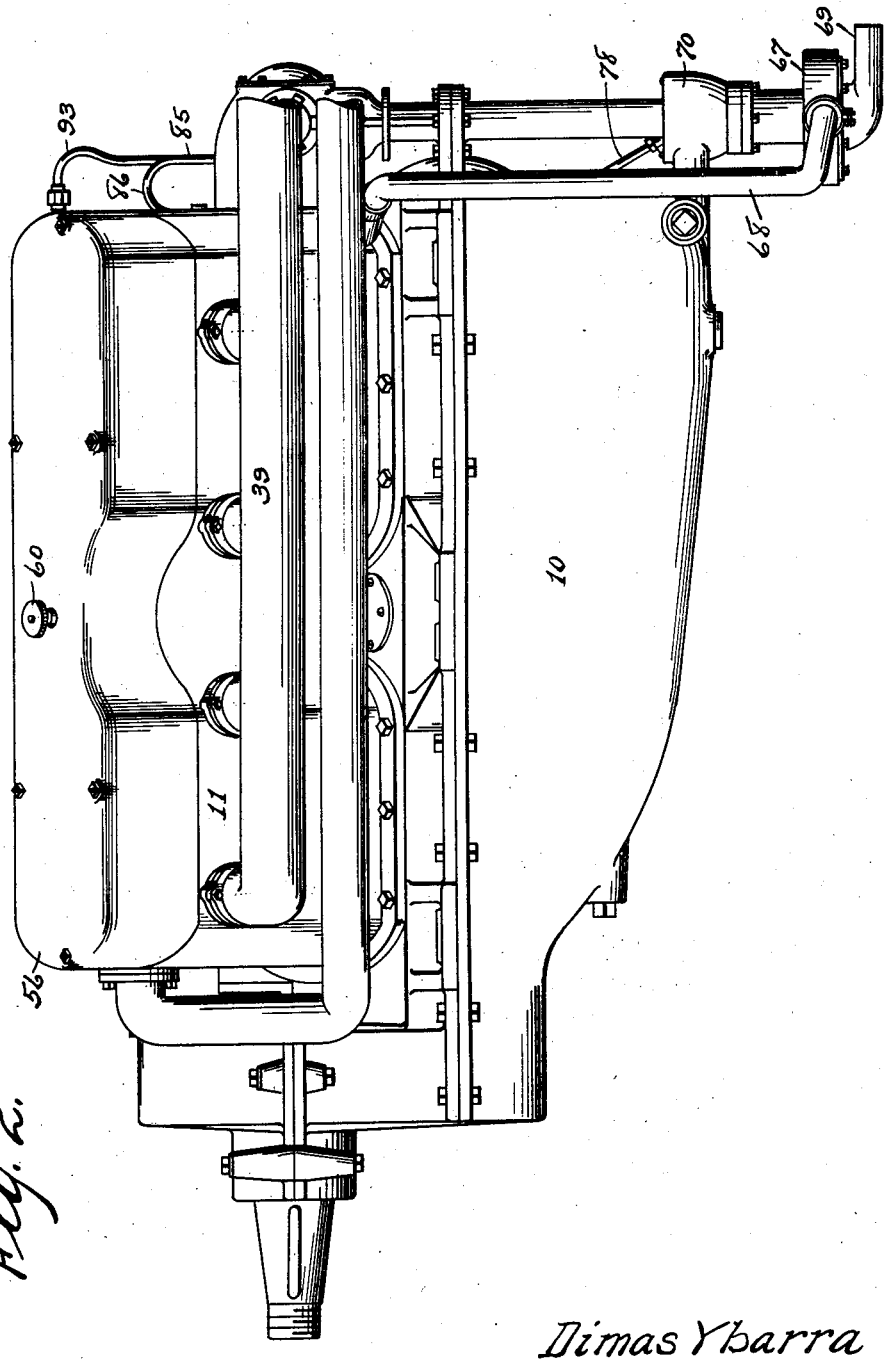

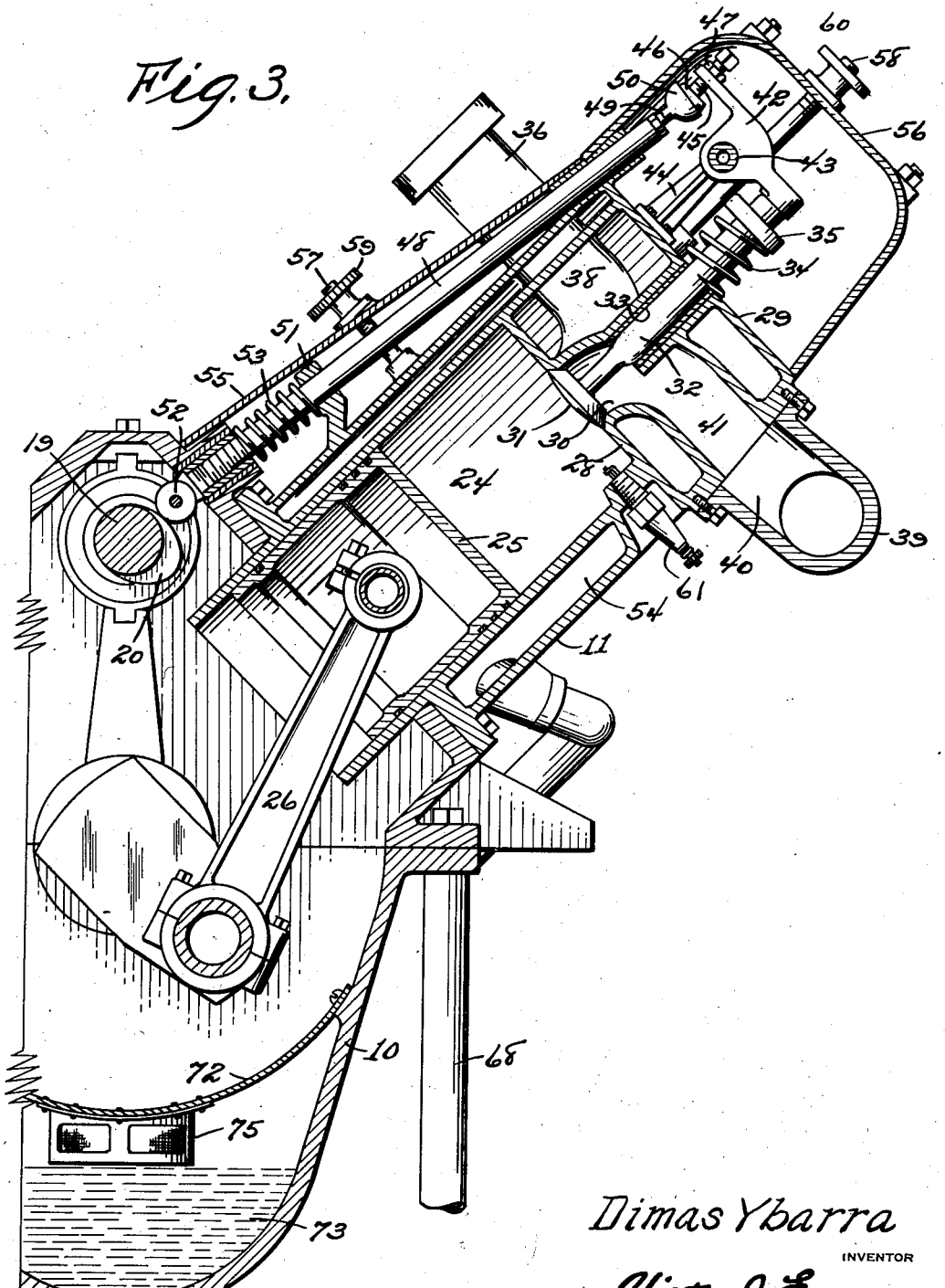

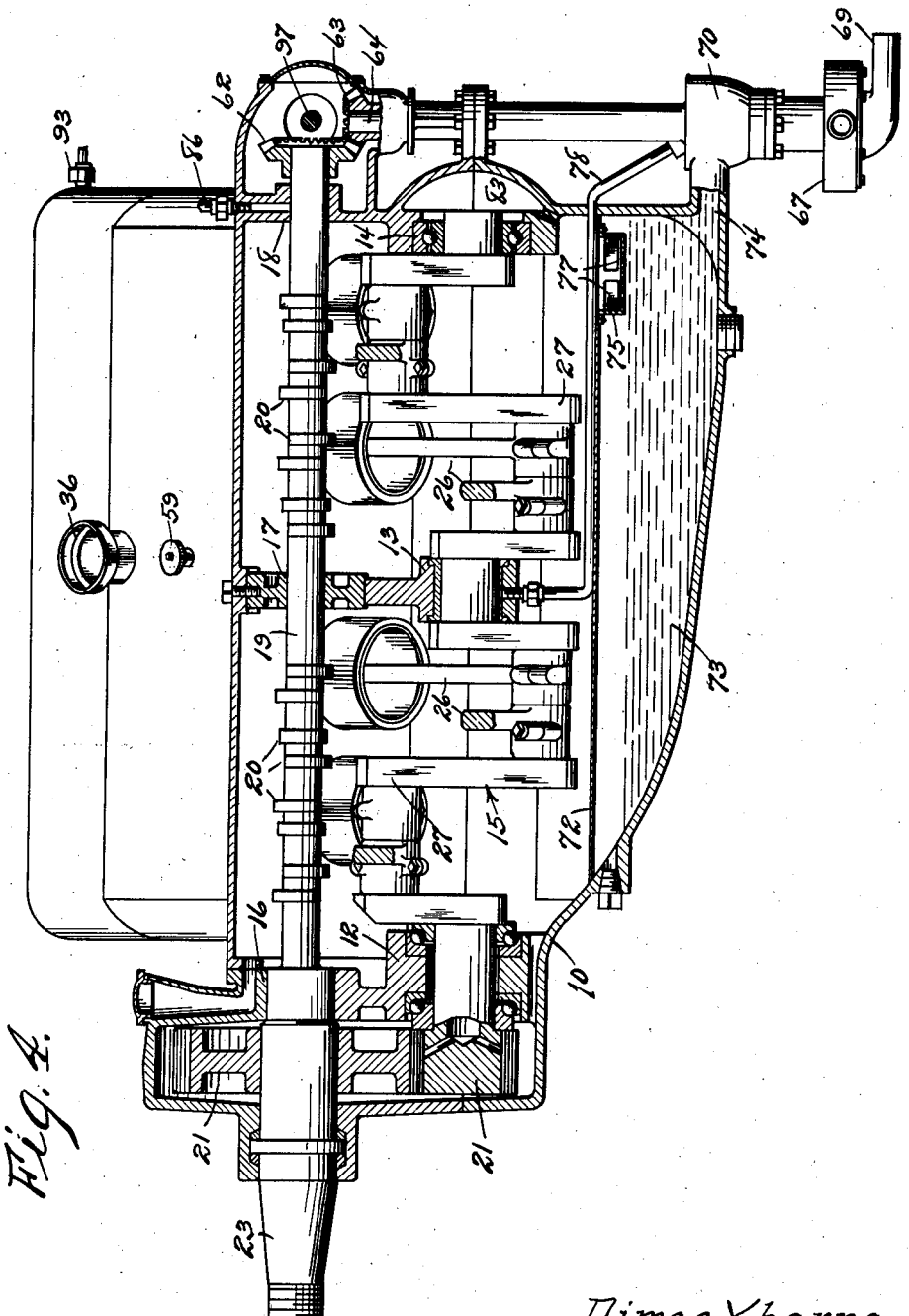

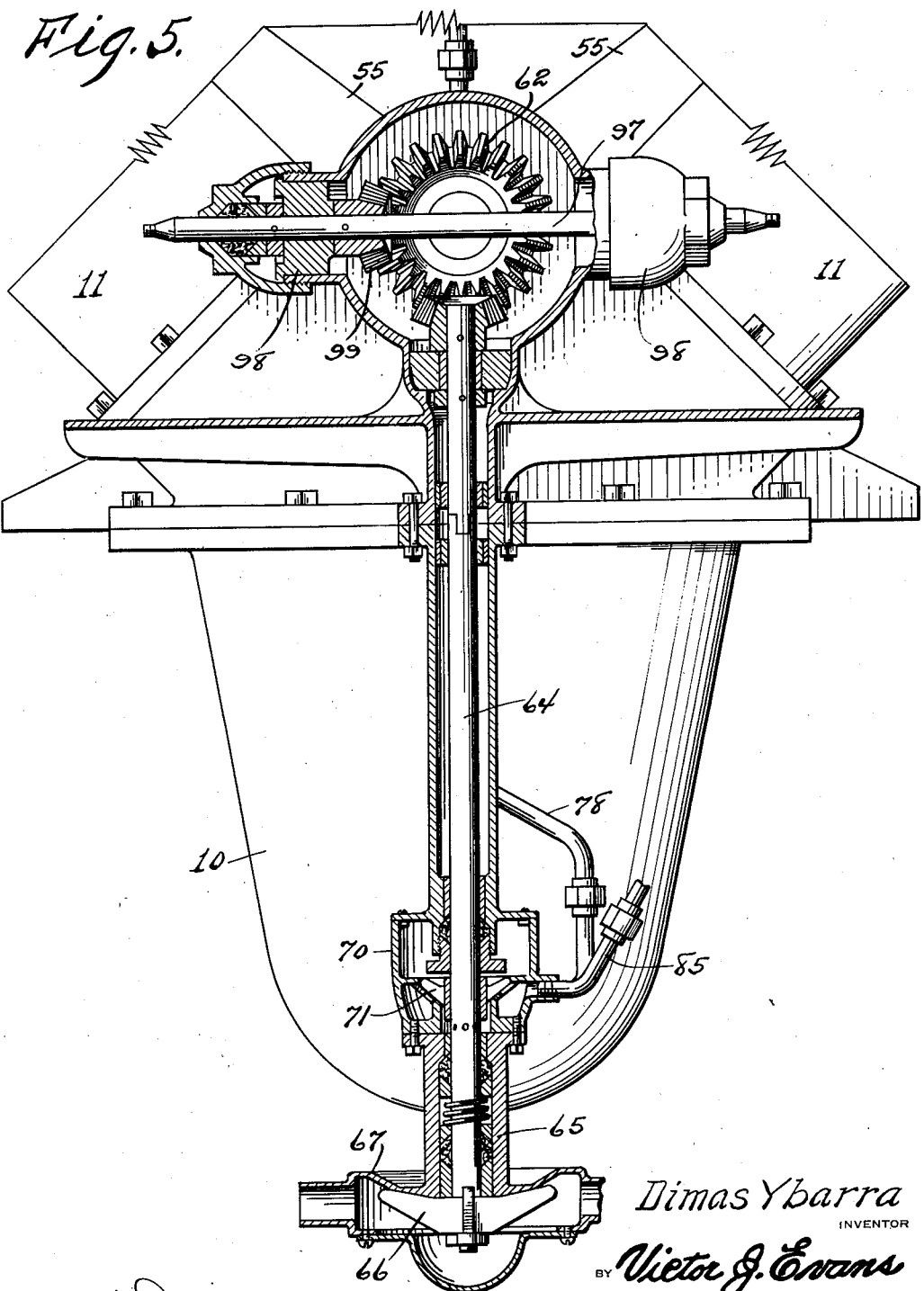

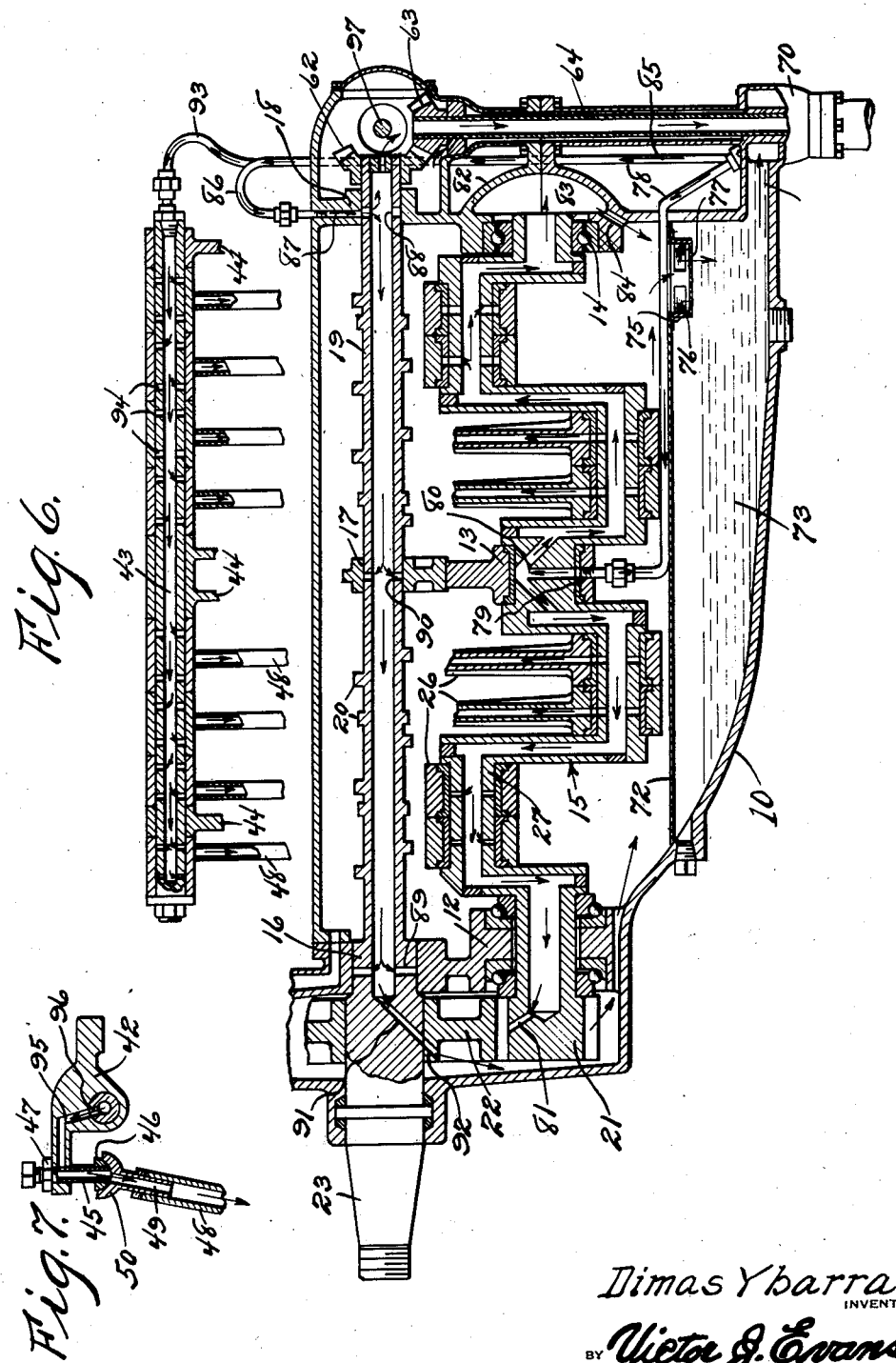

Patented Apr. 6, 1926.

1,580,082

UNITED STATES PATENT OFFICE.

DIMAS YBARRA, OF ZURITA, PANUCO, MEXICO.

MOTOR FOR AIRCRAFTS.

Application filed February 4, 1925. Serial No. 6,823.

*To all whom it may concern:*

Be it known that I, DIMAS YBARRA, a citizen of the Republic of Mexico, residing at Zurita, Panuco, Vera Cruz, Mexico, have invented new and useful Improvements in Motors for Aircrafts, of which the following is a specification.

This invention relates to internal combustion motors and has for its object the provision of a motor of novel design designed particularly for use in the propulsion of aircrafts of various kinds, the primary feature being the provision of an engine or motor which will develop extremely high speed and power with minimum fuel consumption.

An important object is the provision of a motor for this purpose, or any analogous purpose, in which the propeller of the aircraft may be mounted upon and driven by the cam shaft of the motor without the interposition of a transmission mechanism extraneous to the motor itself.

Another object is the provision of a motor having a single means for operating water and oil circulating pumps whereby the amount of mechanism to accomplish circulation will be greatly reduced and the construction consequently simplified.

Still another object is the provision of a motor in which all the working parts are entirely enclosed and consequently protected not only from injury but against dust, dirt and moisture so that the durability will be increased.

A very important feature is the provision of a motor embodying a novel lubricating system in which there will be a forced feed of oil not only to all the bearings but also to the cams, gears and all other working parts, most of the structural elements themselves being of hollow formation to serve as conduits or ducts through which the oil may flow so that a positive and unobstructed circulation thereof will be assured.

An additional object is the provision of a motor which will be comparatively simple and inexpensive in its manufacture and installation, easy to control, positive in action, efficient and durable in service, and a general improvement in the art.

With the above and other objects and advantages in view, the invention consists in the details of construction to be hereinafter more fully described and claimed, and illustrated in the accompanying drawings in which:

Figure 1 is an end elevation of the complete device constructed in accordance to my invention, Figure 2 is a side elevation, Figure 3 is a cross section taken through one of the cylinders and a portion of the crank shaft, Figure 4 is a longitudinal section through the complete motor, Figure 5 is a cross section taken through the pump mechanism, Figure 6 is a detail section showing the crank shaft and the cam shaft in sections to illustrate the lubricating system, and Figure 7 is a detail sectional view through one of the rocker arms and tappet or push rods associated therewith.

Referring more particularly to the drawings, I have shown the motor as including a crank case 10 of sectional construction, as is customary, and upon which are mounted the cylinder blocks 11 preferably arranged in V formation as is usual in motors of the twin type. Within the crank case are bearings 12, 13 and 14 which support the crank shaft 15 which, it will be noted, does not extend beyond the ends of the crank case but which is entirely enclosed therein. The bearings 12 and 14 are illustrated as of the ball type while the central bearing 13 is of conventional pattern. The crank case is also provided with other bearings 16, 17 and 18 for the cam shaft 19 which carries a plurality of cams 20 for operating the valve mechanism to be described. The cam shaft is driven from the crank shaft by intermeshing gears 21 and 22 and one end projects beyond the crank case, as shown at 23 and is adapted to have the propeller mounted directly thereon. Operating within the cylinders in the blocks 11, which cylinders are designated by the numeral 24, are the usual reciprocatory pistons 25 carried by connecting rods 26 which are in turn engaged upon the respective crank portions 27 of the crank shaft.

Within the outer or upper ends of the cylinders are partitions 28 and 29 arranged in spaced relation, the former of which is formed with ports 30 normally closed by inwardly opening valve 31 having stems 32 extending outwardly through the partition member 29 and through a bushing 33 thereon, the valve being held normally to its seat by a coil spring 34 abutting against a stop collar 35 on the stem. The valve arrangement is clearly indicated in Figure 3 and while it is true that only one valve is shown it should of course be understood that there must be two valves for each cylinder, one to control the inlet of explosive mixture and the other to control the exhaust of burnt gases. The numeral 36 indicates a suitable intake manifold which is bolted unto the side of the cylinder blocks and which has branches communicating with passages 38 located between the partitions 28 and 29 and leading to the intake valves or valve openings. The numeral 39 designates the exhaust manifold having branches 40 communicating with passages 41 located between the partitions 28 and 29 and leading to the exhaust valves or valve openings.

The above described structure is duplicated for each cylinder block as will of course be obvious from an inspection of the drawings.

The valve operating means consists of rocker arms 42 carried by a hollow shaft 43 which is stationarily mounted in suitable brackets 44. At one end the rocker arms engage against the outer or upper ends of the valve stems 32 while the other ends carry hollow stems 45 terminating in ball heads 46 and held in adjusted position with respect to the rocker arms by lock nuts 47. Adjustably connected with push or tappet rods 48 extending along the cylinders are hollow stems 49 having cup extensions 50 thereon conformingly engaging the ball heads 46. The push rods or tappets are slidable through suitable guides 51 and carry rollers 52 coacting with the corresponding cams 20 on the cam shaft 19. Coil springs 53 are provided for urging the rollers 52 into firm engagement with the cams. Obviously, when the cam shaft is rotated the cam thereon will operate to impart longitudinal movement to the push or tappet rods 48 and they in turn will operate the rockers 42 which will control the opening of the valves 31. The valves are of course returned to closed position by the springs 34 above described.

The cylinder blocks are formed to provide the usual water jacket 54 for the circulation of water whereby cooling of the cylinders during operation of the engine will be effected. It is preferable to provide cover plates 55 for the push rods and the associated parts and to provide covers 56 for enclosing the rocker arms and valve mechanism. Any desired means may be provided for holding the covers 55 and 56 in place such, for instance, as the threaded stems 57 and 58 carrying clamping nuts 59 and 60, respectively.

Extending into the cylinders at points near the valves therein are the usual spark plugs 61 provided for the purpose of igniting the explosive charge in the respective cylinders. Secured upon the rear end of the cam shaft 19 is a bevel gear 62 meshing with a bevel gear 63 on the upper end of a vertical hollow shaft 64 which has its lower end journaled within a pack bearing 65 and carrying a paddlewheel 66 operating within a casing 67 so as to define a centrifugal pump for insuring a continuous circulation of water for cooling the motor. Connected with the casing 67 are pipes 68 and 69 connected with the water jacket of the motor as shown.

Surrounding the shaft 64 at a point intermediate its ends is a casing 70 within which operate a paddlewheel 71 carried by the shaft and defining a centrifugal pump for oil for effecting thorough lubrication of all the moving parts of the engine. Located thereabove the bottom of the crank case is a horizontal partition 72 which defines a sump chamber 73 for the accumulation of the oil. The bottom of the crank case is inclined rearwardly and at the rear end is a conduit 74 leading into the casing 70 so that all oil accumulating within the sump will flow back into the sump casing. The partition 72 is provided with a well 75 having apertures 76 therein for the passage of oil, the bottom and the openings being covered with wire screen indicated at 77 whereby any foreign matter in the oil will be strained out.

Leading from the oil pump casing 70 is a pipe 78 which leads to the crank shaft bearing 13 and which communicates with a passage 79 therein. The crank shaft itself is hollow throughout its length and that portion engaged within the bearing 13 is provided with a passage 80 communicating with the passage 79 so that oil flowing through the pipe 78 and entering the bearing 13 will also enter the center of the crank case and flow therethrough in opposite direction as indicated by the arrows in Figure 6. At the forward end of the hollow crank shaft are outwardly extending passages 81 which extend through the gear 21 so that oil flowing forwardly through the crank shaft will fly outwardly at the gear 21. At the rear end of the hollow crank shaft is a guard or shell member 82 which defines an oil collecting compartment 83 into which passes all the oil which flows rearwardly through the hollow crank shaft. At the bottom of the compartment 83 is an outlet opening 84 so that oil accumulating therein may flow out onto the partition 72 and thence through the well 75 down into the sump.

A second pipe 85 leads upwardly from the oil pump casing 70, and has its upper end reflexly extended at 87 and leading into a passage 87 in the top portion of the crank case at the center thereof, which passage is located within the bearing 18. Within the bearing 18, the cam shaft 19 is formed with openings 88 so that oil entering the passages 87 through the pipe 85 will flow through the hollow cam shaft. Within the bearings 16 and 17 the hollow cam shaft is formed with other openings 89 and 90, respectively, whereby these bearings will be effectually lubricated. At the forward portion of the hollow cam shaft I provide an inclined passage 91 which communicates with a passage 92 in the hub portion of the gear 22 so that the oil flowing forwardly through the hollow cam shaft will be distributed upon the intermeshing gears 21 and 22.

As stated above, the shaft 43 which supports the various rocker arms are hollow, and leading thereinto at one end are pipes 93 which likewise lead from the pump casing 70 so as to have oil forced constantly therethrough. Within the hub portions of the rocker arms the shafts 43 are formed with openings 94 so that the bearings surfaces of the rocker arms upon the shafts 43 will be effectually lubricated at all times. As above mentioned, the push rods or tappet rods 48 are hollow as are the stems 49 and 45, and the rocker arms are formed with passages 95 communicating with the interiors of the stems 45 and communicating with openings 96 in the stationary shafts 43. By this construction and arrangement it will be seen that oil passing through the pipes 93 into the hollow shaft 43 will pass into the rocker arms and through the passages 95 into the hollow stems 45, through the ball heads 46, cups 50, stems 49 and hollow tappet rods or push rods back onto the outside of the cam shafts and cams, the oil then dripping down through the crank case onto the partition 72 and then into the well 75 into the sump 73.

Journaled transversely of the crank shaft and rotated at the rear end of the cam shaft 19 is a shaft 97 extending through suitable bearings 98 at opposite sides of the crank case and having its ends adapted for connection with a pair of magnetos or the like, not shown. Within the crank case, the shaft 97 carries a bevel gear 99 meshing with the bevel gear 62 on the rear end of the cam shaft.

In the operation, it will be seen that the engine or motor will act in substantially the same manner as an ordinary and well known type of V type twin four, the pistons and valves acting in a well known manner to control the inlet of fuel mixture and the exhaust of burnt gases. It is however to be noted that all of the working parts are enclosed and that a very elaborate and complete lubricating system has been provided for insuring lubrication of all the moving parts, thus reducing wear and practically eliminating danger of burning out of the bearings from any cause. Attention is directed to the fact that the crank shaft does not extend through the ends of the crank case but has its motion imparted to the cam shaft which is made large and heavy and upon which may be secured the propeller without the interposition of any transmission gearing or the like.

The various parts are suitably bushed and otherwise arranged to conform to the highest principles of design. Furthermore the gears are prevented from sliding out of mesh and in general the arrangement is such that there can be no derangement of parts in case the motor is tilted or even inverted, this feature being of prime importance as the motor is intended primarily for use in aircraft.

While I have shown and described the preferred embodiment of the invention it should be understood that I reserve the right to make such changes in the form, construction and arrangement of parts as will not depart from the spirit of the invention or the scope of the subjoined claims.

Having thus described the invention, I claim:

1. In an internal combustion engine, a crank case, a crank shaft journaled within the crank case and formed hollow, a cam shaft driven by the crank shaft, blocks mounted on the crank case and provided with a plurality of cylinders, pistons operating within the cylinders and connected with the crank shaft, valves for the cylinders, hollow supporting shafts, rocker arms mounted on said last named shaft for operating the valves, push rods actuated by the cam shaft and operating said rocker arms, said push rods being hollow, an oil pump for supplying oil to all of said shafts, said stationary shafts being provided with openings and the rocker arms having passages therein receiving oil from said openings and conducting the same into the hollow push rods, and a horizontal partition in the lower portion of the crank case defining a sump leading to the oil pump.

2. In an internal combustion engine, a crank case, a crank shaft journaled within the crank case and formed hollow, a cam shaft driven by the crank shaft, blocks mounted on the crank case and provided with a plurality of cylinders, pistons operating within the cylinders and connected with the crank shaft, valves for the cylinders, hollow supporting shafts, rocker arms mounted on said last named shafts for operating the valves, push rods actuated by the cam shaft and operating said rocker arms, said push rods being hollow, an oil pump for supplying oil to all of said shafts, said stationary shafts being provided with openings and the rocker arms having passages therein receiving oil from said openings and conducting the same into the hollow push rods, and a horizontal partition in the lower portion of the crank case defining a sump leading to the oil pump, said partition having a well therein provided with openings covered with wire screen for filtering the oil.

In testimony whereof I affix my signature.

DIMAS YBARRA.